(12) United States Patent
Kanashiki

(10) Patent No.: US 7,108,235 B2
(45) Date of Patent: Sep. 19, 2006

(54) SUPPORTING APPARATUS FOR A DISPLAY PANEL

(75) Inventor: Masaaki Kanashiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/372,791

(22) Filed: Feb. 26, 2003

(65) Prior Publication Data

US 2003/0164431 A1    Sep. 4, 2003

(30) Foreign Application Priority Data

Mar. 4, 2002   (JP) .............................. 2002-057208
Feb. 18, 2003  (JP) .............................. 2003-039157

(51) Int. Cl.
*A47F 5/00*    (2006.01)

(52) U.S. Cl. .............................. 248/125.1; 248/200.1; 248/917

(58) Field of Classification Search ............. 248/125.1, 248/125.7, 125.8, 917, 920, 157, 200.1, 644; 40/606.14, 606.15, 607.01, 607.03, 482, 40/484, 493, 601; 384/519; 211/123
See application file for complete search history.

(56) References Cited

U.S. PATENT DOCUMENTS

| | | | | |
|---|---|---|---|---|
| 554,857 A * | 2/1896 | Bond | ...................... | 248/125.1 |
| 1,994,225 A * | 3/1935 | Lurcott | ........................ | 248/449 |
| 2,219,169 A * | 10/1940 | Alter | .......................... | 248/694 |
| 2,967,592 A * | 1/1961 | Stein | .......................... | 403/300 |
| 3,022,974 A * | 2/1962 | Knodel | .................... | 248/200.1 |
| 3,225,818 A * | 12/1965 | Wise | ........................... | 160/24 |
| 3,231,230 A * | 1/1966 | Mueller | ...................... | 248/449 |
| 3,327,310 A * | 6/1967 | Bethune et al. | ............. | 343/702 |
| 3,738,606 A * | 6/1973 | Millen | ......................... | 248/449 |
| 5,275,364 A * | 1/1994 | Burger et al. | ............ | 248/125.1 |

FOREIGN PATENT DOCUMENTS

JP    7-230251    8/1995

* cited by examiner

*Primary Examiner*—Ramon O Ramirez
(74) *Attorney, Agent, or Firm*—Fitzpatrick, Cella, Harper & Scinto

(57) ABSTRACT

A supporting apparatus for a display panel is provided with a post having a display panel holder and having its upper and lower ends fixed at the disposition location of the display panel. The post has a mechanism for varying the distance between the upper and lower ends thereof, thereby improving an adaptability of the display panel to the disposition or any location.

3 Claims, 2 Drawing Sheets

SUPPORTING APPARATUS FOR A DISPLAY PANEL

BACKGROUND OF THE INVENTION

1. Field of the Invention

This invention relates to an image apparatus, and more particularly to a supporting apparatus for a display panel.

2. Related Background Art

Regarding a display for use in a school room, a council chamber or the like, it is required that the space occupied by a display apparatus be decreased by the use of a plane type display and the display apparatus be made electrically movable up and down simply by the use of a motor and a worm gear. As a method of providing a supporting apparatus for a plane display in compliance with such a requirement, there has been proposed a supporting apparatus for a plane display (Japanese Patent Application Laid-Open No. 07-230251) as shown in FIG. 3 of the accompanying drawings.

According to this proposition, in FIG. 3, the reference numeral 31 designates a vertical post having a spiral groove, the reference numeral 32 denotes a bearing, the reference numeral 33 designates a sideways U-shaped frame, the reference numeral 34 denotes a worm wheel, the reference numeral 35 designates a DC motor, and the reference numeral 36 denotes a worm.

In this apparatus, the rotation of the DC motor 35 is transmitted to the worm 36, the rotation of which in turn is transmitted to the worm wheel 34, whereby the supporter of the display is electrically moved up and down by means of the bearing 32 and the vertical post 31 provided with the spiral groove.

This proposed supporting apparatus, however, is an apparatus adapted to be mounted on a ceiling or a wall and electrically moved up and down and therefore suffers from the disadvantage that in case where an image is appreciated on a display, the apparatus is limited in the direction in which it is seen.

Generally, a display or a screen is limited in the angle of visibility and therefore, depending on the direction in which it is seen, because of the distortion or the like of an image, including the reproducibility of colors, there is desired such a supporting (installing) apparatus as will enable the display or the screen to be looked squarely at from the front thereof as far as possible, but there has been the disadvantage that this desire cannot be satisfied.

SUMMARY OF THE INVENTION

It is an object of the present invention to provide a supporting apparatus for a display panel which does not limit the disposition location of the display panel to the utmost, but widens the degree of freedom of the disposition location.

It is also an object of the present invention to provide a supporting apparatus for a display panel which, in case wherein an image displayed on the display panel is appreciated, is free to rotate right and left and further is freely variable in an angle of elevation, and enables one to appreciate an image suffering little from the distortion or the like of the image, including the reproducibility of colors.

The present invention is a supporting apparatus for a display panel provided with a post having a holder for the display panel and having its upper and lower ends fixed at the disposition location of the display panel, the post having a mechanism for varying the distance between the upper end and lower end thereof.

Also, the present invention is a supporting apparatus for a display panel provided with a vertical post for supporting the display panel, and upper and lower pedestals fixed to upper and lower fixing surfaces to fix the opposite end portions of the vertical post, and having a length adjusting mechanism for adjusting the combined length of the pedestals and the vertical post combined together in accordance with the difference in height between the upper and lower fixing surfaces, and display panel moving means slidable in a vertical direction relative to the vertical post, movable in a direction rotation and variable in an angle of elevation.

DESCRIPTION OF THE PREFERRED EMBODIMENTS

Figure 1:
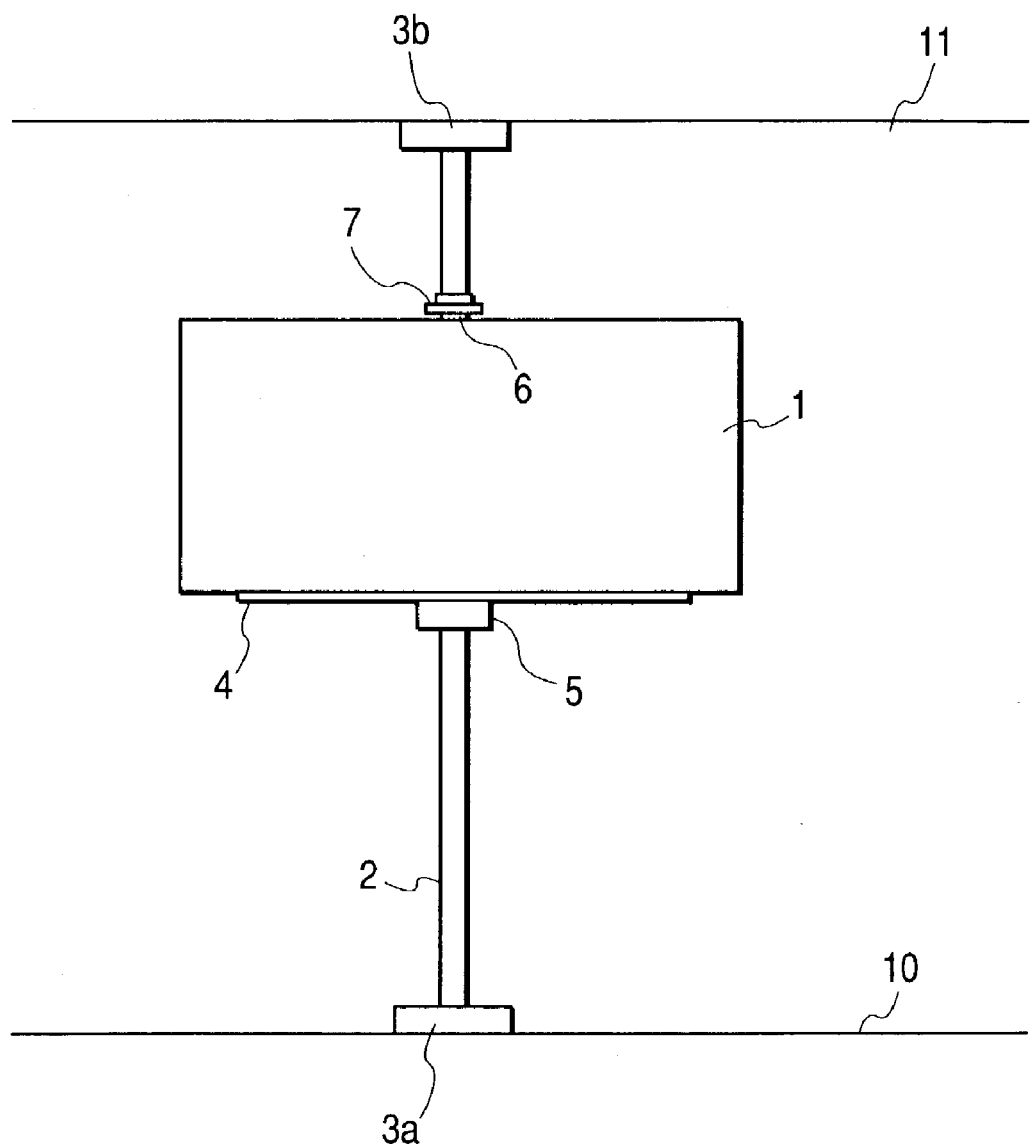
FIG. 1 is an elevational view showing an example of a supporting apparatus for a plane display panel according to an embodiment of the present invention.

A supporting apparatus for a display panel according to the present invention is provided with a post having a display panel holder and having its upper and lower ends fixed at the disposition location of the display panel, and is characterized in that the post has a mechanism for varying the distance between the upper end and lower end thereof.

Also, in the above-described supporting apparatus for a display panel, preferably the post is further provided with a rotating mechanism for rotating the display panel.

Also, in the above-described supporting apparatus for a display panel, preferably the post is further provided with a lift mechanism for moving the display panel in a vertical direction.

Also, in the above-described supporting apparatus for a display panel, preferably the post is further provided with a mechanism for varying the angle of elevation of the display surface of the display panel.

Also, in the above-described supporting apparatus for a display panel, preferably the width of the post, i.e., the length thereof in a direction orthogonal to the vertical direction, is shorter than the width of the display panel.

Also, a supporting apparatus for a display panel according to another invention is provided with a vertical post for supporting the display panel, and upper and lower pedestals fixed to upper and lower fixing surfaces to fix the opposite end portions of the vertical post, and has an adjusting mechanism for adjusting the combined length of the pedestals and the vertical post combined together in accordance with the difference in height between the upper and lower fixing surfaces, and display panel moving means slidable in a vertical direction relative to the vertical post, movable in a direction of rotation, and variable in an angle of elevation.

Also, in the above-described another invention, it is desirable that the movement in the direction of rotation by the display panel moving means be electrically effected.

Also, in the above-described another invention, it is preferable that the fixing of the pedestals to the upper and lower fixing surfaces be fixing based on the use of a material of a great coefficient of friction in a portion contacting with at least one of the upper and lower fixing surfaces or screw fixing and be releasable.

In the present invention described above, the fixing surfaces to which the upper and lower ends of the post or the pedestals of the post are fixed are, for example, a floor surface and a ceiling surface, the upper surface of furniture and the ceiling surface, the floor surface and the lower surface of the furniture disposed in opposed relationship therewith, the upper surface of the furniture and the lower surface of the furniture disposed in opposed relationship therewith, or the like.

With the construction as described above, in the supporting apparatus of the present invention, the degree of freedom of the disposition location of the display panel widens. Also, in case where an image is appreciated, the supporting apparatus is designed to be free to rotate to right and left and further be freely variable in an angle of elevation and therefore, an image suffering little from the distortion or the like of the image, including the reproducibility of colors, can be appreciated.

An embodiment of the present invention will hereinafter be described in detail with reference to the drawings.

FIG. 1 is a front view showing a preferred specific embodiment of a supporting apparatus for a display panel according to the present invention.

This supporting apparatus for a display panel is provided with a vertical post 2 extending in a vertical direction and supporting the display panel 1, pedestals 3 (3a, 3b) for supporting this vertical post 2, a display panel holder 4, a rotating mechanism 5 for rotating the display panel 1, an upwardly and downwardly moving (lift) mechanism 6 for upwardly and downwardly moving the display panel 1, and a supporter 7 for the display panel. Display panel moving means slidable in a vertical direction relative to the vertical post 2, movable in a direction of rotation and variable in an angle of elevation is constituted by the display panel holder 4, the rotating mechanism 5, the upwardly and downwardly moving mechanism 6 and the display panel supporter 7.

The display panel 1 is a plane display. The vertical post 2 is a post for supporting the load of the entire supporting apparatus including the display panel 1, and has its opposite ends supported between a floor surface 10 as a lower fixing surface and a ceiling surface 11 or the like as an upper fixing surface by the pedestals 3 (3a, 3b).

The pedestals 3 (3a, 3b) are for fixing the vertical post 2 to the floor surface 10 and the ceiling surface 11 or the like, and generally they are in contact with the floor surface 10 and the ceiling surface 11 or the like by their receiving surfaces larger than the cross-sectional area of the vertical post 2, and disperse the load applied to the vertical post 2 and transmit it to the floor surface 10 and the ceiling surface 11 or the like, and are releasably fixed to the floor surface 10 and the ceiling surface 11 or the like by screwing or a material of a great frictional resistance.

The vertical post 2 or the pedestals 3 are of such a construction that the combined length thereof when they are combined together can be adjusted in accordance with the height between the floor surface 10 and the ceiling surface 11 or the like. For example, there is a construction in which provision is made of screws coupled to each other and one of the screws is fixed and the other screw is rotated, whereby the screws can be expanded or contracted to thereby adjust their length.

The display panel holder 4 is for holding the display panel 1 on the post.

The rotating mechanism is comprised, for example, of a ball bearing, and is such a mechanism as makes the display panel 1 freely rotatable about the vertical post 2. The rotating mechanism can be manually rotated, but alternatively may be electrically driven by a motor or the like.

The upwardly and downwardly moving (lift) mechanism 6 is a mechanism using for example, a slide bearing for enabling the display panel 1 to be freely moved in a vertical direction and be also fixed.

The supporter 7 is for adjusting the angle of elevation, and fixing the display panel 1.

Figure 2:
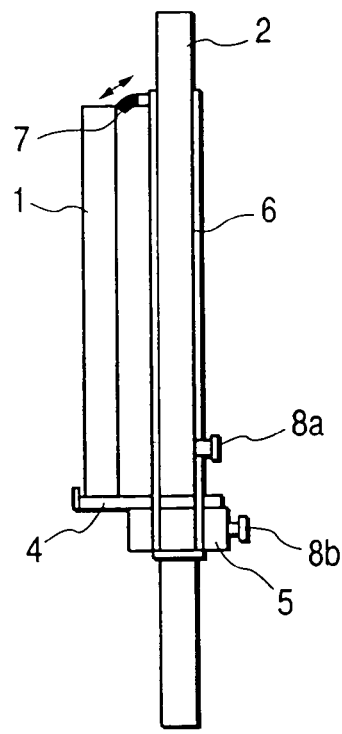
FIG. 2 is a cross-sectional view of an essential portion showing an example of the supporting apparatus for a plane display panel according to the embodiment of the present invention.
Figure 3:
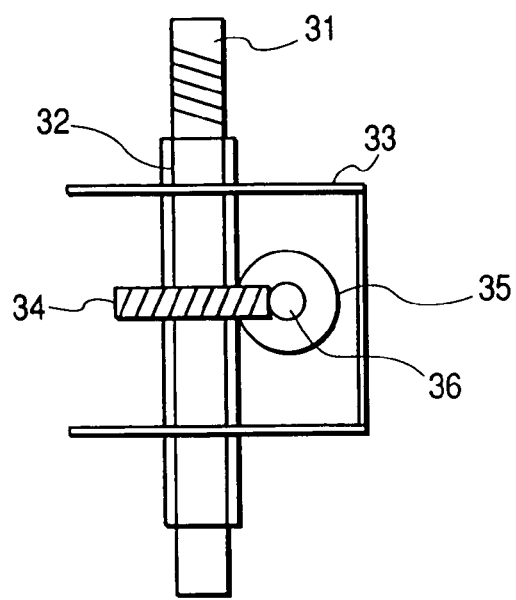
FIG. 3 shows an example of a supporting apparatus for a plane display panel according to the prior art.

FIG. 2 shows a cross-sectional view of the essential portions of an embodiment of a method of effecting the desired upward and downward movement, rightward and leftward rotation, adjustment of the angle of elevation and fixing.

In FIG. 2, the vertical post 2 has its opposite end portions fixed between the floor surface 10 and the ceiling surface 11 or the like.

The upwardly and downwardly moving mechanism 6 is provided with a slide bearing in a cylindrical member for enabling it to be freely moved and fixed in the vertical direction (upwardly and downwardly) of the vertical post 2, and the vertical post 2 extends through the inside of the straight portion of the cylindrical member perpendicular to the floor surface, and provision is made of a fixing screw 8a for fixing the mechanism 6 to the vertical post 2 at a desired position in the vertical direction. This fixing screw 8a has the function of fixing the upward and downward movement of the upwardly and downwardly moving mechanism 6 relative to the vertical post 2.

By providing the slide bearing as described above, it becomes possible to move and fix the display panel to and at a desired position in the vertical direction (upward and downward directions).

What is similar to the fixing screw 8a is also provided as a fixing screw 8b on the rotating mechanism 5, and this fixing screw 8b is used to fix the rotation of the ball bearing of the holder 4, i.e., the rotating mechanism 5, relative to the slide bearing of the upwardly and downwardly moving mechanism 6, and by loosening the fixing screw 8b, it becomes possible to move the display panel 1 to a desired position in the direction of rotation (right and left) about the vertical post 2, and by fastening the fixing screw 8b, it becomes possible to fix the display panel 1.

As regards the ball bearing portion of the holder 4, the slide bearing of the upwardly and downwardly moving mechanism 6 extends through the inside thereof and moves to the desired position in the direction of rotation (right and left), and thereafter is fixed by the fixing screw 8b. That is, the upwardly and downwardly moving mechanism 6 and the ball bearing portion 5 are rotatably supported, and a stopper for stopping the rotation thereof is the fixing screw 8b.

Description will now be made of the operation of the supporting apparatus for the display panel having the above-described construction.

When the supporting apparatus is to be used, the fixing screw 8a provided in the coupling portion between the vertical post 2 and the slide bearing of the upwardly and downwardly moving mechanism 6 is first loosened so that it may become possible to move the upwardly and downwardly moving mechanism in the vertical direction (upwardly and downwardly).

The slide bearing of the upwardly and downwardly moving mechanism 6 set at a desired position in the upward and downward directions is fixed by the fixing screw 8a, whereby the safety thereof is secured.

When it is desired to move the position of the display panel 1 in the right and left direction of rotation after it has been set at a desired position in the upward and downward directions, the fixing screw 8b provided in the slide bearing of the upwardly and downwardly moving mechanism 6 and the ball bearing portion of the display panel holder 4 is loosened so as to make it possible to move the display panel in the direction of rotation (right and left).

When the display panel holder 4 is manually moved and stopped, the display panel 1 can be stopped and fixed at a desired right and left position. Next, it is fixed by the fixing screw 8b to thereby secure the safety thereof.

Further, when it is desired to change the angle of elevation, the display panel supporter 7 can be extended to thereby change the angle of elevation to a desired angle.

As this display panel supporter 7, simply use can also be made of a metallic chain or the like.

In this manner, when the supporting apparatus is to be used, it can be stopped and fixed at any rotational angle in the upward and downward directions and the right and left direction, further at a desired angle of elevation.

Further, as another method (not shown) of rotating this apparatus, a rotating device, e.g. an antenna rotator for rotating an antenna may be used as the lower pedestal 3a of the upper and lower pedestals 3 shown in FIG. 1, and a most bearing using, for example, a rotary bearing may be used as the upper pedestal 3b, and the entire apparatus including the vertical post 2 may be rotated.

As described above, the present invention widens the degree of freedom of the disposition location of the display panel and improves an adoptability of the display panel to the disposition or any location. Also, the supporting apparatus for a display panel according to the present invention, even if it is installed in a school room or the council chamber, or further a home or the like, can reduce the space occupied by itself, and can achieve the effective utilization of a space, and when it is desired to change the up and down position, the right and left angle and the angle of elevation of the display panel, it becomes possible to freely move and fix the display panel, and in case where an image is appreciated by the use of the display panel, it is possible to appreciate an image suffering little from the distortion or the like of the image, including the reproducibility of colors.

What is claimed is:

1. A supporting apparatus for a display panel comprising: a post having a display panel holder and upper and lower ends respectively fixed on fixed planes, the panel holder having distal ends extending in opposite directions from a longitudinal axis of the post, the post having a mechanism for varying the distance between the upper end and the lower end thereof, wherein the post is further provided with a rotating mechanism for rotating the display panel about the longitudinal axis of the post, and a lift mechanism, independent from the rotating mechanism, for moving the display panel in an upward and downward direction, with the rotating mechanism provided with a ball bearing disposed at a periphery of the post, and the lift mechanism provided with a cylindrical member having a slide bearing through the center of which the post passes through.

2. The supporting apparatus according to claim 1, wherein the upper end of the post is fixed on a ceiling of a room or on a plane of furniture within the room, while the lower end of the post is fixed on a floor of the room or on a plane of the furniture.

3. A supporting apparatus for a display panel according to claim 1, wherein the post is further provided with a mechanism for varying the angle of elevation of a display surface of the display panel.

* * * * *

UNITED STATES PATENT AND TRADEMARK OFFICE
CERTIFICATE OF CORRECTION

PATENT NO. : 7,108,235 B2
APPLICATION NO. : 10/372791
DATED : September 19, 2006
INVENTOR(S) : Masaaki Kanashiki It is certified that error appears in the above-identified patent and that said Letters Patent is hereby corrected as shown below:

COLUMN 5:

Line 16, "simply" should read --simple--.
Line 31, "adoptibility" should read --adaptibility--.

COLUMN 6:

Line 24, claim 1 "passes through." should read --passes.--.

Signed and Sealed this

Twenty-fourth Day of June, 2008

JON W. DUDAS
*Director of the United States Patent and Trademark Office*